UNITED STATES PATENT OFFICE.

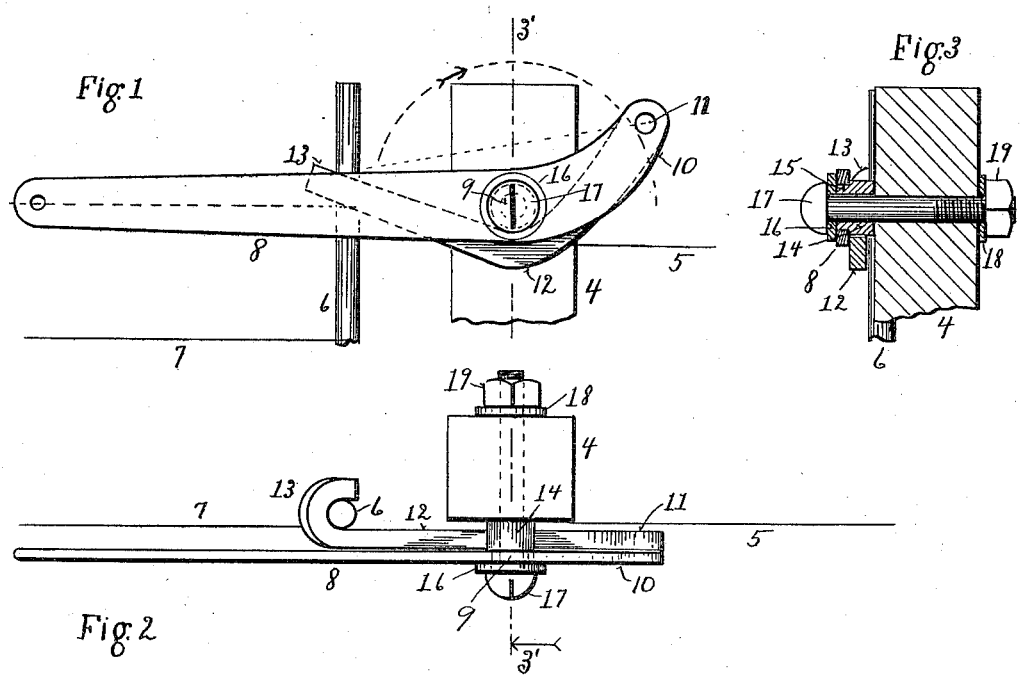

ABRAHAM S. CROYLE, OF NEAR AUBURN, KANSAS.

GATE-LATCH.

1,032,883.

Specification of Letters Patent. Patented July 16, 1912.

Application filed June 29, 1910. Serial No. 569,484.

*To all whom it may concern:*

Be it known that I, ABRAHAM S. CROYLE, a citizen of the United States, and residing near Auburn, in the county of Shawnee and State of Kansas, have invented a new and useful Improvement in Gate-Latches, of which the following is a specification.

My improved gate-latch is specially applicable to farm gates comprising two or more strands of wire secured at one end to one of the gate-posts and at the other end to a pole which is to be secured to the other gate-post. This is the cheapest gate, perhaps, that can be constructed, and yet is strong and efficient in every way, except in the matter of securing the pole to the adjacent post.

It is the object of my invention to secure the pole to the post by a simple operation, to secure it firmly, and to open the gate as well, all by a very simple operation. And my invention comprises a simple, strong, durable, and efficient gate-latch for securing the pole to the adjacent post.

It also comprises the details of construction hereinafter set forth and claimed.

In the drawings accompanying and forming part of this specification, and in the description of the drawing, I have shown my invention in its preferred form; but obviously changes in form, proportions, and materials, the transposition of parts, and the substitution of equivalent members, may be resorted to, within the scope of the appended claim, without departing from the spirit of my invention.

Figure 1 is a side elevation of my improved gate-latch applied to a gate of the kind described. Fig. 2 is a top view. Fig. 3 is a section through the line 3' of Figs. 1 and 2.

Similar reference characters indicate like or corresponding parts throughout the several views.

4 is the gate-post and 5 may represent one of the fence wires.

6 is the pole of the gate at the free end of the wires 7, 7, of such a gate as I have described. The lower end of the pole is usually secured in a loop fastened to the post 4, and the upper end is ordinarily secured by a similar loop; but it is always hard to draw the gate up tight and secure it in the upper loop.

My improved latch is as follows: The rod, or lever, or bar 8 is pivoted to the post at 9, its long end forming a handle, and its other end 10 being pivoted at 11 to a bent rod 12. This rod is so bent as to come down under the pivot 9, and is provided at its other end with a hook 13 to engage the pole 6; the parts being so arranged that when the lever is in the position shown in the drawings, the latch becomes locked with the pivot 9 below the imaginary line extending from 11 to 13. To release it, turn the lever over as indicated by the arrow, which will let out the hook so that the pole may be removed therefrom; while the reverse operation will serve to draw the gate up tight and lock it.

Now my invention has specially to do with the means for pivoting the main lever to the post. Between the main lever and the post is a washer or spacer 14 with a reduced neck 15 on which the said lever is pivoted. A hole is bored through the post, and a bolt 17 is inserted through the washer and the post and drawn up firm by means of the nut 19. If desired, the washers 16 and 18 may be inserted under the head and nut of the bolt. The main body of the washer 14 is long enough so as to allow ample clearance for the bent-rod 12 between the lever and the post, as shown, and the neck is long enough to permit free movement of the lever thereon even though the bolt be drawn up very tight, as it is desirable to draw this bolt quite tight to secure it firmly.

It will now be understood that all that is necessary to do to put my latch on the gate, is to bore the hole through the post, put the bolt through with the other parts thereon, and draw up the bolt tight by means of the nut 19.

What I claim is:

In combination, a bolt having a head and adapted to be passed through a hole in a fence post, a nut for the bolt, an elongated spacer secured on the bolt between the head and the post and having a reduced neck adjacent the head, an operating lever pivoted loosely on the neck, one end of the lever forming a handle, and a bent rod pivoted at one end to the other end of the lever and having a hook at its other end for engaging the gate-pole and being so shaped as to bear against the under side of the spacer below the line from the pivot to the hook; all substantially as set forth.

In testimony whereof I have signed my name to this specification in the presence of witnesses.

ABRAHAM S. CROYLE.

Witnesses:
J. M. STARK,
C. J. ROSEN.

Copies of this patent may be obtained for five cents each, by addressing the "Commissioner of Patents, Washington, D. C."